United States Patent
Alhozaimy et al.

(10) Patent No.: US 11,964,911 B2
(45) Date of Patent: Apr. 23, 2024

(54) CORROSION-PREVENTING ADDITIVE FOR REINFORCED CONCRETE

(71) Applicants: Abdulrahman Alhozaimy, Riyadh (SA); Raja Rizwan Hussain, Riyadh (SA); Abdulaziz Al-Negheimish, Riyadh (SA); Devendra Deo Narain Singh, Riyadh (SA)

(72) Inventors: Abdulrahman Alhozaimy, Riyadh (SA); Raja Rizwan Hussain, Riyadh (SA); Abdulaziz Al-Negheimish, Riyadh (SA); Devendra Deo Narain Singh, Riyadh (SA)

(73) Assignee: Postnikov, Al-Ahsa (SA)

( * ) Notice: Subject to any disclaimer, the term of this patent is extended or adjusted under 35 U.S.C. 154(b) by 0 days.

(21) Appl. No.: 18/082,398

(22) Filed: Dec. 15, 2022

(65) Prior Publication Data
US 2023/0406769 A1 Dec. 21, 2023

Related U.S. Application Data

(62) Division of application No. 17/513,714, filed on Oct. 28, 2021, now abandoned.

(51) Int. Cl.
| | |
|---|---|
| *C04B 14/48* | (2006.01) |
| *C04B 24/06* | (2006.01) |
| *C04B 28/02* | (2006.01) |
| *C04B 40/00* | (2006.01) |
| C04B 103/00 | (2006.01) |
| C04B 103/61 | (2006.01) |
| C04B 111/26 | (2006.01) |

(52) U.S. Cl.
CPC .............. *C04B 24/06* (2013.01); *C04B 14/48* (2013.01); *C04B 28/02* (2013.01); *C04B 40/0039* (2013.01); C04B 2103/0093 (2013.01); C04B 2103/61 (2013.01); C04B 2111/26 (2013.01)

(58) Field of Classification Search
CPC ......... C04B 24/06; C04B 14/48; C04B 28/02; C04B 40/0039; C04B 2103/0093; C04B 2103/61; C04B 2111/26; C04B 24/00; C04B 40/00; C04B 32/02; C04B 24/02; C23F 11/00; C23F 11/12; C23F 15/00; C09D 123/00; C09D 5/08
See application file for complete search history.

(56) References Cited

U.S. PATENT DOCUMENTS

| | | | |
|---|---|---|---|
| 4,391,645 A | 7/1983 | Marcellis et al. | |
| 5,522,927 A | 6/1996 | Hegge | |
| 2019/0382308 A1* | 12/2019 | Wang | C04B 14/005 |

FOREIGN PATENT DOCUMENTS

| | | | |
|---|---|---|---|
| CN | 103882440 A | | 6/2014 |
| CN | 110437629 A | | 11/2019 |
| JP | 01153561 A | | 5/1989 |
| KR | 20110000913 A | * | 1/2011 |
| KR | 101658372 B1 | | 9/2019 |
| WO | 2009112647 A2 | | 9/2009 |

OTHER PUBLICATIONS

KR20110000913a, machine translation (Year: 2011).*
BRIX[ et aL "Effectiveness of rienna leaves extract and its derivatives as green corrosion fnhfbitors of reinforcement steel exposed to chlorides." European Journal of Environmental and Civil Engineering {2021 ): 1-1 R (Abstract only).
MSDS ethylene glycol [Retrieved from the internet at Mar. 23, 2022 <URL: https://fscimage.fishersci.com/msds/09400.htm>] (Year: 2007).
KR-101658372-B1, machine translation (Year: 2016).

* cited by examiner

*Primary Examiner* — Anthony J Green
*Assistant Examiner* — Marites A Guino-O Uzzle
(74) *Attorney, Agent, or Firm* — Nath, Goldberg & Meyer; Richard C. Litman

(57) ABSTRACT

The corrosion-preventing additive for reinforced concrete is a concrete additive for preventing corrosion of steel rebars in steel-reinforced concrete. The corrosion-preventing additive is a solution with an organic solvent, the solute being either gallic acid (3,4,5-trihydroxybenzoic acid), at least one ester of gallic acid, or combinations thereof. The weight-to-volume concentration of the solute to the organic solvent may be between 1% and 10% w/v. Reinforced concrete may be made using the corrosion-preventing additive by mixing the corrosion-preventing additive with a conventional concrete mixture (i.e., a mixture of an aggregate, water, and cement), with at least one steel rebar being embedded in the mixture, similar to conventional steel rebar reinforced concrete. The concentration of the corrosion-preventing additive with respect to the cement of the mixture may be between 0.0125 wt % and 1.0 wt %.

8 Claims, 6 Drawing Sheets

CORROSION-PREVENTING ADDITIVE FOR REINFORCED CONCRETE

This is a Divisional Application of U.S. patent application Ser. No. 17/513,714, filed Oct. 28, 2021, the content of which is hereby incorporated by reference in its entirety.

BACKGROUND

1. Field

The disclosure of the present patent application relates to a corrosion inhibitor, and particularly to a corrosion-preventing additive for reinforced concrete to provide protection against chloride-induced corrosion of steel rebars in reinforced concrete.

2. Description of the Related Art

Steel rebar is commonly used for the reinforcement of concrete. Typically, manufactured steel rebar is often coated with black oxide (i.e., "mill scale"), which is a mixture of three phases of iron oxide, namely wüstite (FeO) near the steel surface, magnetite ($Fe_3O_4$) above the layer of wüstite, and a top portion of the scale formed from hematite ($\alpha$-$Fe_2O_3$). These layers of different phases of iron oxide develop cracks, since their coefficients of expansion and compaction due to changes in temperature differ to a more significant extent than those of the underlying steel structure.

Rebars covered in mill scale, along with rust, are incorrectly considered to provide protection against corrosive attack on their surfaces when embedded in concrete. The presence of the mill scale actually accelerates corrosive reactions. This is due to the cracks that form in the scale, as well as the presence of unstable oxides of iron. Both the cracks and the unstable iron oxides are conducive to the formation of galvanic cells, which accelerate corrosive reactions in the rebar.

Due to the problems associated with mill scale, descaling of the rebar prior to its embedding in concrete may be performed. Although descaling improves the general corrosion resistance of the rebar, and also increases the threshold chloride concentration for the onset of a corrosion pitting attack, the process of descaling (typically conducted on-site) is very expensive, time-consuming, and requires cumbersome equipment. Other methods include surface coating, the use of corrosion inhibitors, and the application of cathodic protection. However, the compositions and methods involved for each of these techniques are not only expensive, but have a tendency to affect the quality of the concrete, as well as the bond strength between the concrete and the rebar. Thus, a corrosion-preventing additive for reinforced concrete solving the aforementioned problems is desired.

SUMMARY

The corrosion-preventing additive for reinforced concrete is a concrete additive for preventing corrosion of steel rebars in steel-reinforced concrete. The corrosion-preventing additive is a solution having an organic solvent, such as an alcohol, the solute being either gallic acid (3,4,5-trihydroxybenzoic acid), at least one ester of gallic acid (also referred to herein as a "gallate" or "galloylated ester"), or combinations thereof. Esters of gallic acid suitable for use in the additive include, for example, methyl gallate, ethyl gallate, propyl gallate, isopropyl gallate, butyl gallate, isobutyl gallate, pentyl gallate, isopentyl gallate, octyl gallate, dodecyl gallate, epicatechin gallate, epigallocatechin gallate, gallocatechin gallate, and theaflavin-3-gallate. Alcohol solvents suitable for use in the additive include, for example, methanol, ethanol, propanol, isopropanol, butanol, isobutanol, and combinations thereof. The percentage of solute dissolved in alcohol solvent may be between 1% and 10% w/v. Preferably, the weight-to-volume ratio of the solute to the alcohol solvent is between 2% and 5.5% w/v. More preferably, the weight-to-volume ratio of the solute to the alcohol solvent is between 2.5% and 4.5% w/v.

Reinforced concrete may be made using the corrosion-preventing additive by mixing the corrosion-preventing additive with a conventional concrete mixture (i.e., a mixture of an aggregate water, and cement), having at least one steel rebar embedded in the mixture, similar to conventional steel rebar reinforced concrete. The concentration of the corrosion-preventing additive with respect to the cement weight of the mixture may be between 0.0125 wt % and 1.0 wt %. Preferably, the concentration of the corrosion-preventing additive with respect to the cement of the mixture is between 0.025 wt % and 0.75 wt %. More preferably, the concentration of the corrosion-preventing additive with respect to the cement of the mixture is between 0.0625 wt % and 0.5 wt %.

The additive is added in water to be used for making the mixture, followed by mechanical mixing of the mixture (i.e., a mixture of an aggregate, water, cement, and the additive) to ensure uniform mixing of the different components.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
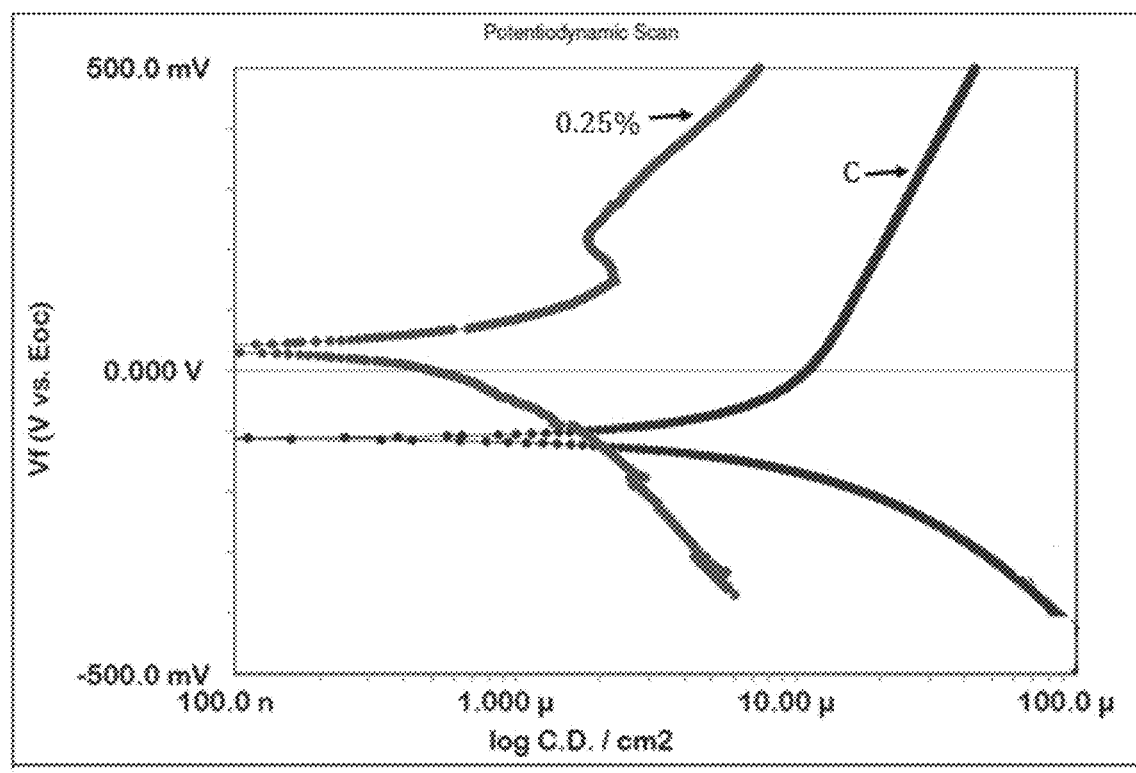
FIG. 1 is a composite potentiodynamic polarization plot comparing a control sample of steel rebar embedded in concrete without additive with a sample of steel rebar embedded in concrete and treated with a corrosion-preventing additive for reinforced concrete.

The corrosion-preventing additive for reinforced concrete is a concrete additive for preventing corrosion of steel rebars in steel-reinforced concrete. The corrosion-preventing additive is a solution made with an organic solvent, more particularly an alcohol solvent, the solute being either gallic acid (3,4,5-trihydroxybenzoic acid), at least one ester of gallic acid, or combinations thereof. Suitable examples of galloylated esters include methyl gallate, ethyl gallate, propyl gallate, isopropyl gallate, butyl gallate, isobutyl gallate, pentyl gallate, isopentyl gallate, octyl gallate, dodecyl gallate, epicatechin gallate, epigallocatechin gallate, gallocatechin gallate, and theaflavin-3-gallate. Suitable examples of alcohol solvents include methanol ethanol, propanol, isopropanol, butanol, isobutanol, and combinations thereof. The concentration of the solute dissolved in the alcohol solvent may be between 1% and 10% w/v. Preferably, the weight-to-volume of the solute in the alcohol solvent is between 2% and 5.5% w/v. More preferably, the weight-to-volume concentration of the solute to the alcohol solvent is between 2.5% and 5.5% w/v.

Reinforced concrete may be made using the corrosion-preventing additive by mixing the corrosion-preventing additive with a conventional concrete mixture (i.e., a mixture of an aggregate, water, and cement), at least one steel rebar being embedded in the mixture, similar to conventional steel rebar reinforced concrete. The concentration of the corrosion-preventing additive with respect to the cement of the mixture may be between 0.0125 wt % and 1.0 wt %. Preferably, the concentration of the corrosion-preventing additive with respect to the cement of the mixture is between 0.025 wt % and 0.75 wt %. More preferably, the concentration of the corrosion-preventing additive with respect to the cement of the mixture is between 0.0625 wt % and 0.5 wt %.

For purposes of testing the additive for controlling corrosion and pitting, carbon-manganese steel rebars were used, each having a length of 150 mm and a diameter of 12 mm. The steel rebars were de-scaled by abrasion with a motorized wheel fitted with sandpaper. The rebars, following cleaning with acetone, were embedded in a concrete mixture with a binder (cement):water:aggregate (sand) ratio of 1:0.35:2, the additive being added during mixing of the ingredients. After curing the concrete for 28 days, following the standard recommended procedures, the concrete samples were subjected to wet/dry treatments. The concrete samples were kept wet in 0.6 M chloride solution for 10 days, followed by their drying in a laboratory environment for 15 days. These wet/dry treatments were taken as one cycle. Such wet/dry treatments augment the migration of moisture, gases and chloride ions through the samples, thus accelerating the onset and propagation of corrosion reactions at the surface of the embedded rebars.

The polarization resistance of the rebars was measured by electrochemical impedance spectroscopy. In this technique, a sinusoidal voltage of 10 mV was introduced at the corroding interface at their corrosion potentials. The frequencies of the sinusoidal voltage were varied between 100 KHz to 0.001 Hz. The resulting impedance and shift in phase with changes in frequencies were monitored using a potentiostat. For determination of polarization resistance and other impedance parameters of the corroding surfaces in the presence (and the absence) of admixtures, a constant phase element (CPE) model was used to extract data. Polarization resistance measured by this technique is inversely related to the corrosion current density ($I_{corr}$) and follows the Stern-Geary equation:

$$I_{corr} = \frac{B}{R_p},$$

where B is a constant and $R_p$ is the polarization resistance (measured in $\Omega \cdot cm^2$). The Stern-Geary equation shows that the corrosion current density, and thus the corrosion rate of a corroding metal-electrolyte interface, has an inverse relationship with $R_p$.

Example 1

Compressive Strength Testing

Concrete cubes including varying concentrations of the corrosion-preventing additive were cast as described in ASTM C109 and cured under standard curing conditions. The water-to-cement ratio was maintained at 0.35 for the sample cubes (C:W:S ratio=1:0.35:2). As shown in Table 1 below, the corrosion-preventing additive has no deleterious effect on the compressive strength of the cast concrete cubes tested within concentration ranges of 0.0625 wt % to 0.25 wt % with respect to the cement. It should be noted that beyond this concentration range, the corrosion-preventing additive has deleterious effect on the strength. For all the further experiments, the above range of concentrations was used to assess the efficacy of the corrosion-preventing additive. Table 1 below shows the compressive strengths measured at 28 days and 90 days after curing.

In order to prepare the additive, laboratory grade gallic acid was purchased from E. Merck KG of Germany. Due to the poor solubility of gallic acid in water (1.9 g/100 ml), the gallic acid was dissolved in methanol (with a solubility of about 29 g/100 ml). A quantity of 25 grams of gallic acid in powder form was dissolved in one liter of methanol under gentle stirring at 25-30° C. in a glass bottle covered with a lid to avoid evaporation loss of the solvent. The resultant solution was left in the lid-covered bottle for 24 hours to ensure the complete miscibility and the reaction, if any, of the components. This solution of gallic acid in methanol was used as the stock solution and is hereinafter referred to as "the additive") for testing the effectiveness of the additive as an inhibitor for chloride-induced corrosion for reinforced steel bars, for the compressive strength of cast concrete cubes, and for slump improvement. The "% additive" mentioned in the following examples is taken with respect to the weight of the cement. The additives was not further diluted, but was used as prepared in the stock solution to test the efficacy of the additive.

TABLE 1

Average Compressive Strength of the Sample Cubes

| Sample | wt % additive | Compressive Strength After Curing | |
|---|---|---|---|
| | | 28 Days | 90 Days |
| 1 | 0 (control) | 73.5 | 90.3 |
| 2 | 0.0625 | 77.8 | 96.5 |
| 3 | 0.125 | 75.9 | 89.2 |
| 4 | 0.250 | 70.0 | 88.2 |
| 5 | 0.500 | 43.7 | 60.1 |

Example 2

Plasticity Effect of Additive

As shown in Table 2 below, the corrosion-preventing additive may also be used as a super plasticizer for increasing the workability of concrete. The results shown in Table 2 indicate that the addition of the corrosion-preventing additive considerably increases the slump area in comparison to the control sample.

TABLE 2

Plasticity at Different Concentrations of Additive with w/c = 0.35 (ASTM C230 Flow Table Test)

| Sample | wt % Additive | Plasticity (% flow) |
|---|---|---|
| 1 | 0 (control) | 25 |
| 2 | 0.0625 | 39 |
| 3 | 0.125 | 43 |
| 4 | 0.250 | 41 |
| 5 | 0.500 | 44 |

Example 3

Potentiodynamic Polarization Testing

FIG. 1 shows the results of the corrosion-preventing additive on the corrosion behavior of steel reinforcement bars after 37 cycles of wet/dry treatment of concrete mixtures. The anodic Tafel polarization tests of reinforcement bars in concrete without the additive (i.e., the control) are shown as in FIG. 1 as curve "C". The additive was used at a concentration of 0.25 wt % with respect to the cement. As can be seen in FIG. 1, the anodic polarization curve for the additive is considerably shifted in the lower current density region with respect to the plot for the control rebar. This indicates that the additive has imparted very significant protection against pitting and uniform corrosion of the reinforcement bars.

Example 4

EIS Testing for Different Concentrations of Additive

Figure 2A:
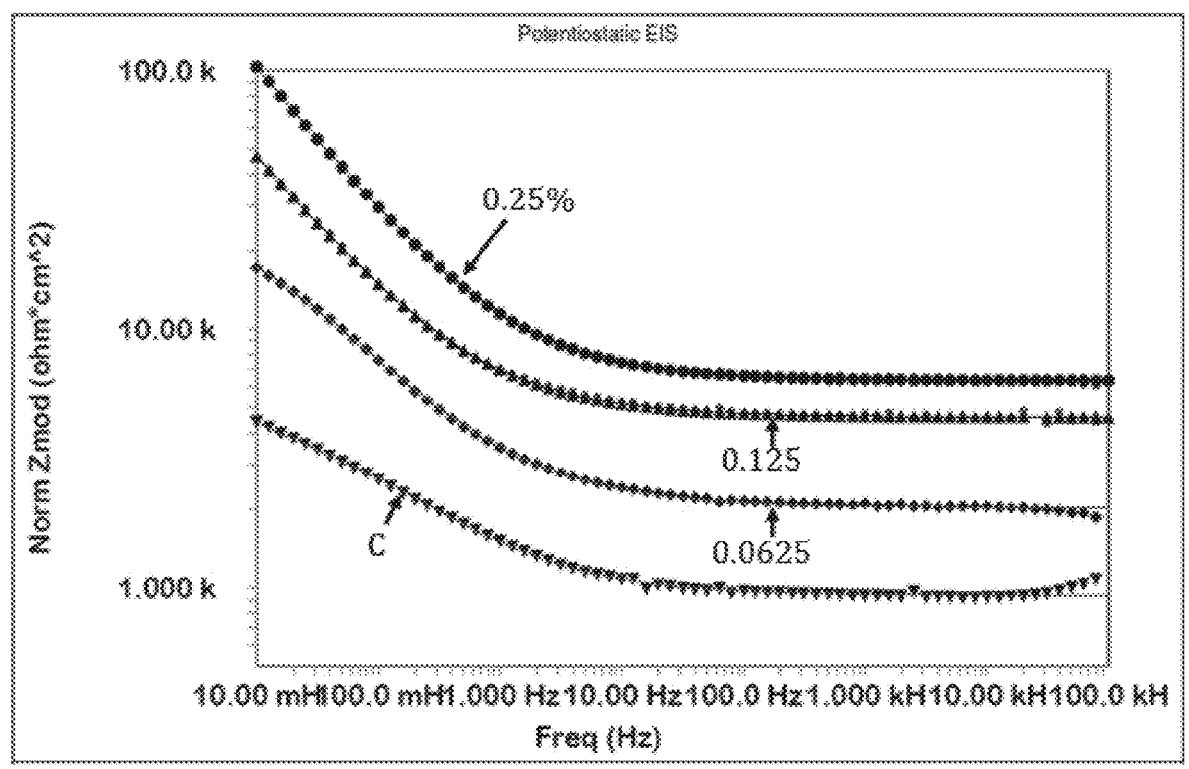
FIG. 2A is a composite comparing electrochemical impedance spectroscopic (EIS) plots (Bode plots of the magnitude of the impedance as a function of frequency) for a control sample of steel rebar embedded in concrete and samples of steel rebar embedded in concrete and treated with the corrosion-preventing additive for reinforced concrete at varying concentrations.
Figure 2B:
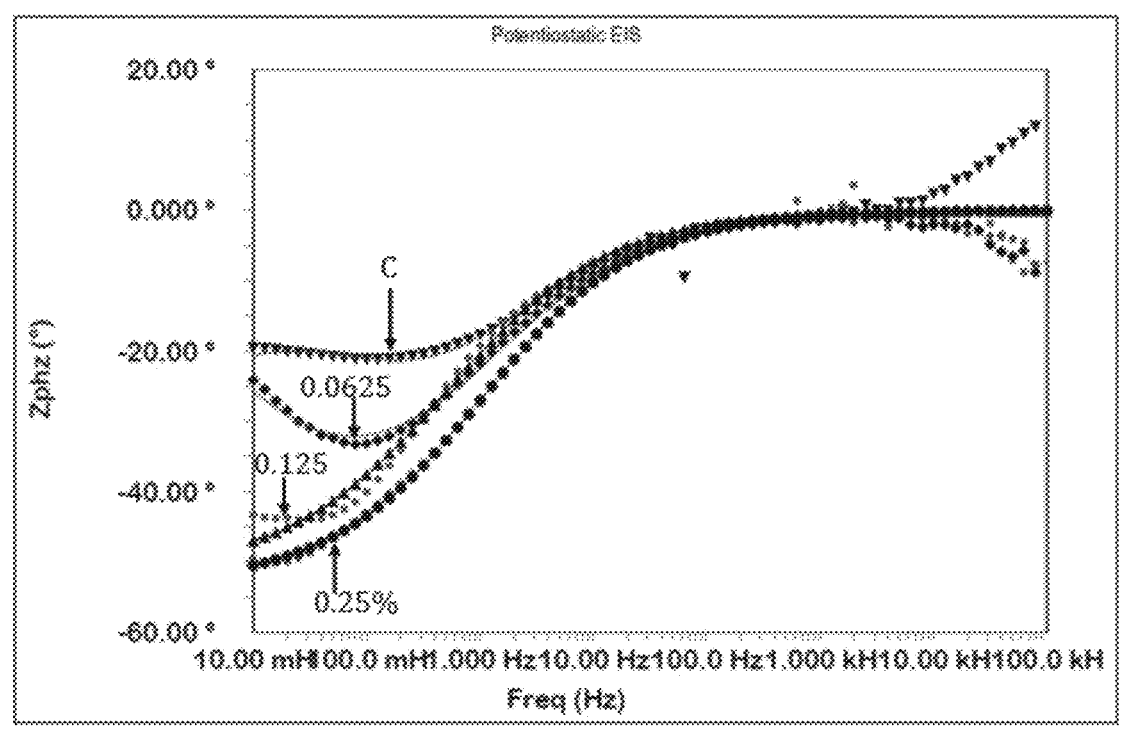
FIG. 2B is a composite comparing EIS plots (Bode plots of the phase angle of the impedance as a function of frequency) for a control sample of steel rebar embedded in concrete and samples of steel rebar embedded in concrete and treated with the corrosion-preventing additive for reinforced concrete at varying concentrations.

FIGS. 2A and 2B are impedance magnitude and phase angle plots, respectively, produced using electrochemical impedance spectroscopy (EIS) after 37 cycles of wet/dry treatments for the reinforced concrete prepared at different concentrations of the additive. The corrosion parameters extrapolated from the plots using the best fitting method with a constant phase element model are summarized in Table 3.

TABLE 3

Electrochemical Parameters -Effect of Additive Concentration

| Concentrations of Additive (w.r.t. % weight of cement) | $R_p$ (KΩ · cm$^2$) | $Y_0$ (S · s$^a$/ cm$^2$) | A | $W_d$ (S · s$^{(1/2)}$/ cm$^2$) |
|---|---|---|---|---|
| 0 (control) | 3.36 | 442.4 × 10$^{-6}$ | 0.574 | 2.22 × 10$^{-3}$ |
| 0.0625 | 15.73 | 51.55 × 10$^{-6}$ | 0.592 | 237.4 × 10$^{-6}$ |
| 0.125 | 32.83 | 14.84 × 10$^{-6}$ | 0.564 | 2.837 × 10$^{-6}$ |
| 0.25 | 980.0 | 5.147 × 10$^{-6}$ | 0.593 | 84.0 × 10$^{-9}$ |
| 0.50 | 973.0 | 4.539 × 10$^{-6}$ | 0.573 | 82.0 × 10$^{-9}$ |

The polarization resistance ($R_p$), which is inversely proportional to corrosion rate, is significantly higher in the presence of the additive with respect to the control, which indicates that the additive reduces the corrosion rate. The significant reduction in $Y_0$ (i.e., the factor incorporating double layer capacitance) and also in $W_d$ (the components for diffusion of oxygen and ionic species through the passive layer) in the different concentrations of the additive also confirm that the rebar surfaces are comparatively less affected by corrosion species (chloride, moisture and oxygen) in the presence of the additive.

Example 5

EIS Testing for Different Durations of Exposure to Corrosion

Figure 3A:
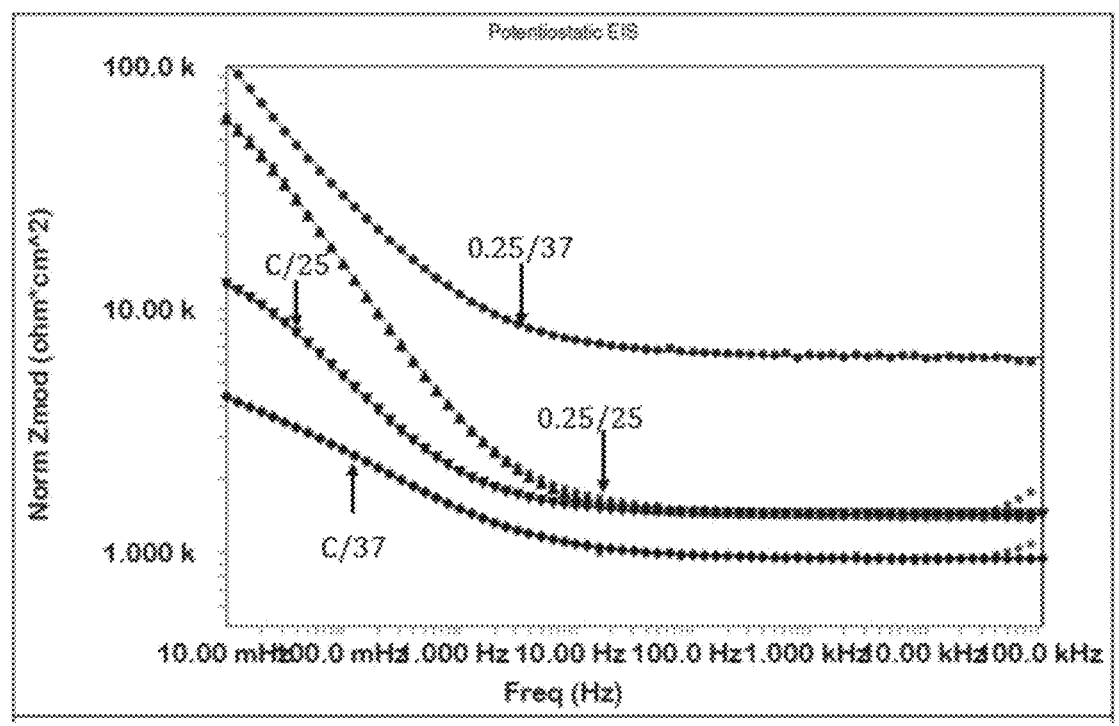
FIG. 3A is a composite comparing electrochemical impedance spectroscopic (EIS) plots (Bode plots of the magnitude of the impedance as a function of frequency) for a control sample of steel rebar embedded in concrete and samples of steel rebar embedded in concrete and treated with the corrosion-preventing additive for reinforced concrete at 0.25% concentration, the samples being pretreated with different numbers of wet/dry cycles.
Figure 3B:
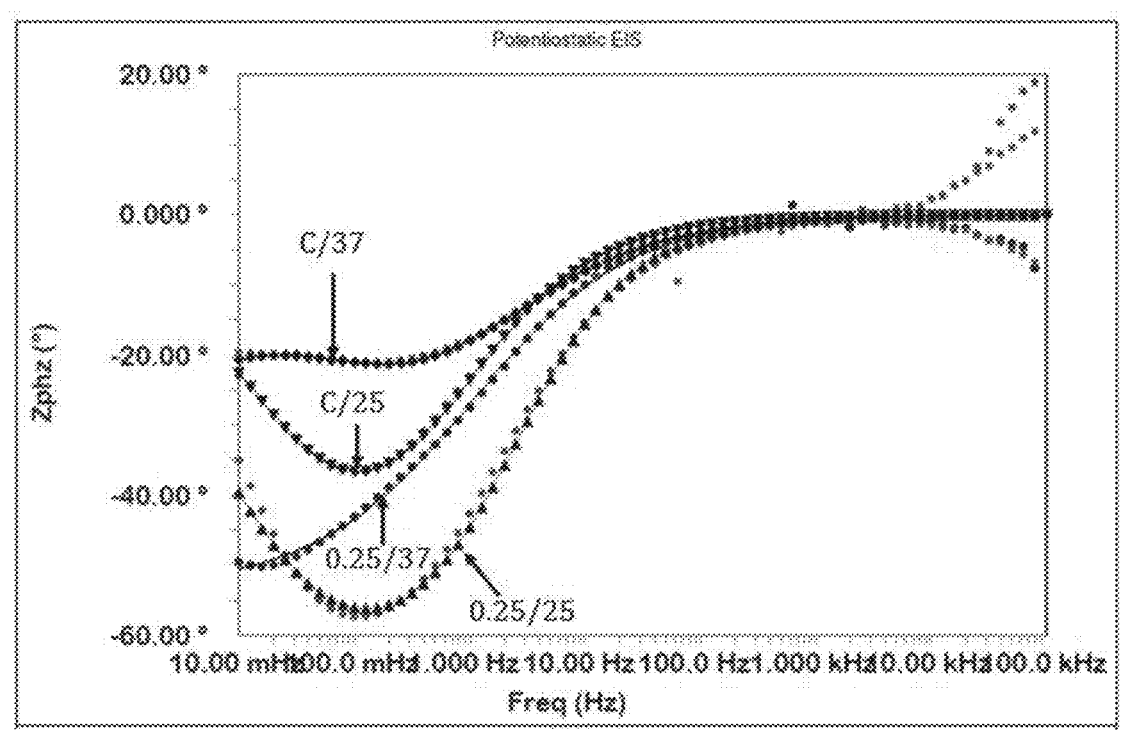
FIG. 3B is a composite comparing EIS plots (Bode plots of the phase angle of the impedance as a function of frequency) for a control sample of steel rebar embedded in concrete and samples of steel rebar embedded in concrete and treated with the corrosion-preventing additive for reinforced concrete at 0.25% concentration, the samples being pretreated with different numbers of wet/dry cycles.

FIGS. 3A and 3B are impedance magnitude and phase angle plots, respectively, produced using electrochemical impedance spectroscopy (EIS) on samples of reinforced concrete treated with 0.25 wt % of the additive after 25 cycles and 37 cycles of wet/dry exposure to chloride ion, respectively. The extracted impedance parameters from the impedance magnitude and phase angle plots of FIGS. 3A and 3B using the constant phase element model, as discussed above, are given below in Table 4. As can be seen, with an increase in duration of exposure, the parameters for the control samples have drastically deteriorated, which indicates that sufficient chloride had reached the rebar/pore solution interface, thus causing degradation of the passive film. The data for the additive added to the concrete, however, shows an appreciable improvement, thus indicating strengthening of the passive film. This is likely due either to the fact that chloride ions had not reached the surface of the rebars or the adsorbed layer of the additive increased the threshold concentration of chloride for the onset of corrosion reactions at the surface of the rebars.

TABLE 4

Electrochemical Parameters-Effect of Duration of Exposure

| Cycles of wet/dry treatment | Control | | | | Additive (0.25%) | | | |
|---|---|---|---|---|---|---|---|---|
| | $R_p$ (KΩ · cm$^2$) | $Y_0$ (Ss$^a$/ cm$^2$) | α | $W_d$ (S√s/ cm$^2$) | $R_p$ (KΩ · cm$^2$) | $Y_0$ (Ss$^a$/ cm$^2$) | α | $W_d$ (S√s/ cm$^2$) |
| 25 | 11.92 | 356.9 × 10$^{-6}$ | 0.678 | 2.80 × 10$^{-3}$ | 118.2 | 91.03 × 10$^{-6}$ | 0.747 | 3.00 × 10$^{-3}$ |
| 37 | 3.36 | 442.4 × 10$^{-6}$ | 0.574 | 2.92 × 10$^{-3}$ | 980.0 | 51.47 × 10$^{-6}$ | 0.593 | 84 × 10$^{-9}$ |

Example 6

Effect of Additive on Pitting Corrosion

Figure 4:
FIG. 4 are digital photographic images of steel rebar samples removed from a control concrete sample and from concrete samples treated with the corrosion-preventing additive for reinforced concrete at varying concentrations of the additive to show the difference in chloride-induced pitting in the surfaces of the rebars.

After 37 cycles of wet/dry treatments, the rebars were removed from the sample concrete cubes, FIG. 4 shows the results for additive concentrations of 0.25 wt %, 0.125 wt % and 0.0625 wt % (relative to the weight of cement), compared against the control sample with no additive (labeled as "C" in FIG. 4). As shown in FIG. 4, the surfaces of the rebars embedded in the control sample experienced severe pitting attack. Under identical test conditions, the rebars embedded in the samples containing the additive (particularly for concentrations ≥0.125 wt %) did not show any trace of rust or pits on the surfaces.

It is to be understood that the corrosion-preventing additive for reinforced concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. Reinforced concrete which is reinforced using a corrosion-preventing additive that provides corrosion resistance to steel rebars and enhances properties of mortars/reinforced concrete, the corrosion preventative additive for said reinforced concrete comprising a solute dissolved in an organic solvent, said solute comprising at least one solute selected from the group consisting of gallic acid and at least one ester of gallic acid, wherein said reinforced concrete is made by mixing said corrosion-preventing additive with a mixture of concrete, and wherein at least one steel rebar is embedded in said reinforced concrete and has improved corrosion resistance and strength/workability as provided by the corrosion-preventing and mortar/concrete property enhancing additive.

2. The reinforced concrete with a corrosion-preventing and mortar/concrete property enhancing additive as recited in claim 1, wherein said corrosion-preventing and mortar/concrete property enhancing additive has a concentration with respect to said cement of said mixture between 0.0125 wt % and 1.0 wt %.

3. The reinforced concrete with a corrosion-preventing and mortar/concrete property enhancing additive as recited in claim 1, wherein said concentration of said corrosion-preventing and mortar/concrete property enhancing additive with respect to said cement of said mixture is between 0.025 wt % and 0.75 wt %.

4. The reinforced concrete with a corrosion-preventing and mortar/concrete property enhancing additive as recited in claim 1, wherein said concentration of said corrosion-preventing and mortar/concrete property enhancing additive with respect to said cement of said mixture is between 0.0625 wt % and 0.5 wt %.

5. The reinforced concrete with a corrosion-preventing and mortar/concrete property enhancing additive as recited in claim 1, wherein said organic solvent comprises at least one alcohol selected from the group consisting of methanol, ethanol, propanol, isopropanol, butanol, and isobutanol.

6. The reinforced concrete with a corrosion-preventing and mortar/concrete property enhancing additive as recited in claim 5, wherein said corrosion-preventing and mortar/concrete property enhancing additive has a weight-to-volume concentration of said solute to said organic solvent of between 1% and 10% w/v.

7. The reinforced concrete with a corrosion-preventing and mortar/concrete property enhancing additive as recited in claim 5, wherein said corrosion-preventing and mortar/concrete property enhancing additive has a weight-to-volume concentration of said solute to said organic solvent of between 2% and 5.5% w/v.

8. The reinforced concrete with a corrosion-preventing and mortar/concrete property enhancing additive as recited in claim 5, wherein said corrosion-preventing and mortar/concrete property enhancing additive has a weight-to-volume concentration of said solute to said organic solvent of between 2.5% and 4.5% w/v.

* * * * *